A. H. ASPROOTH AND A. M. LEONI.
CHANGE SPEED GEARING.
APPLICATION FILED JULY 2, 1919.
1,385,105.
Patented July 19, 1921.
2 SHEETS—SHEET 1.
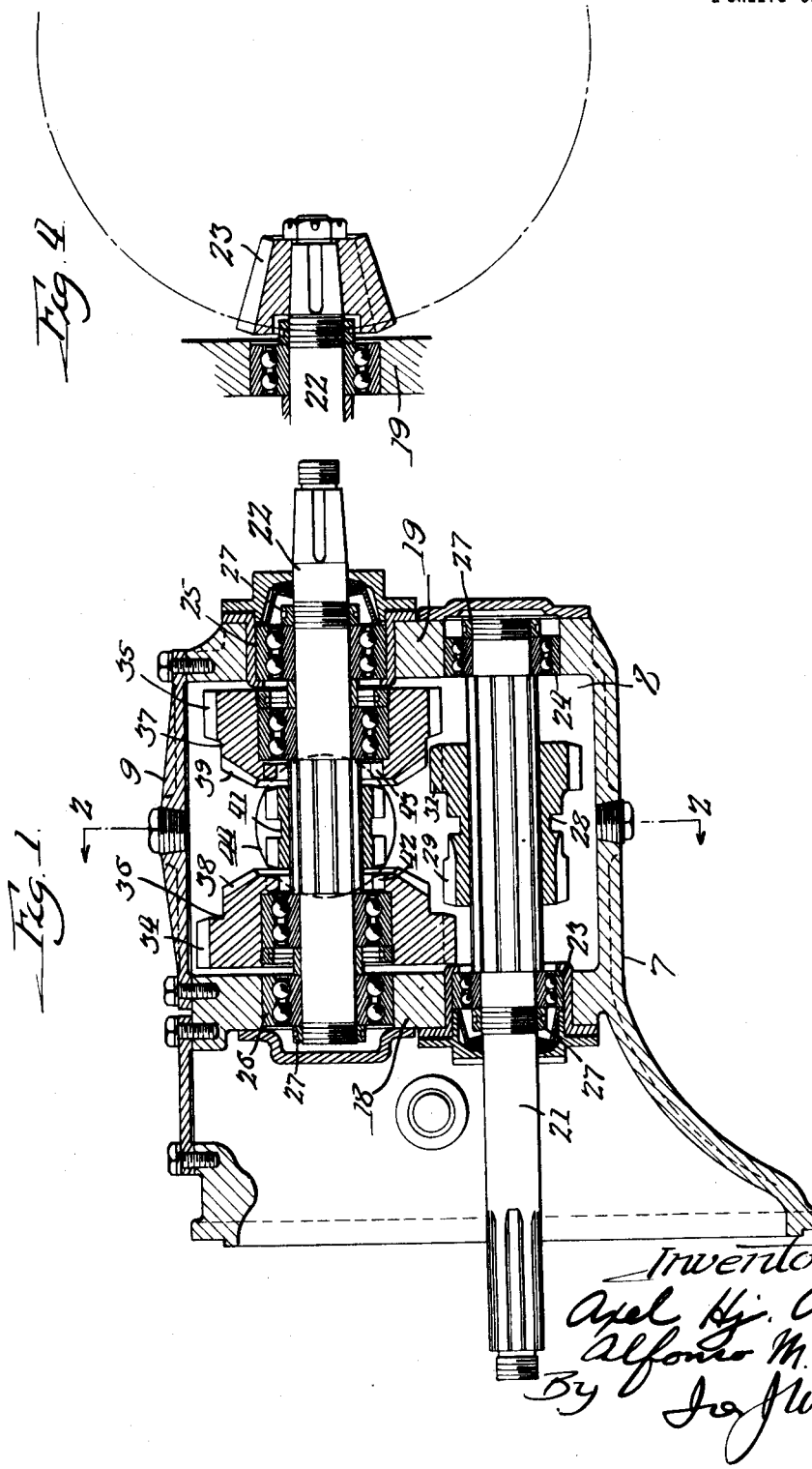

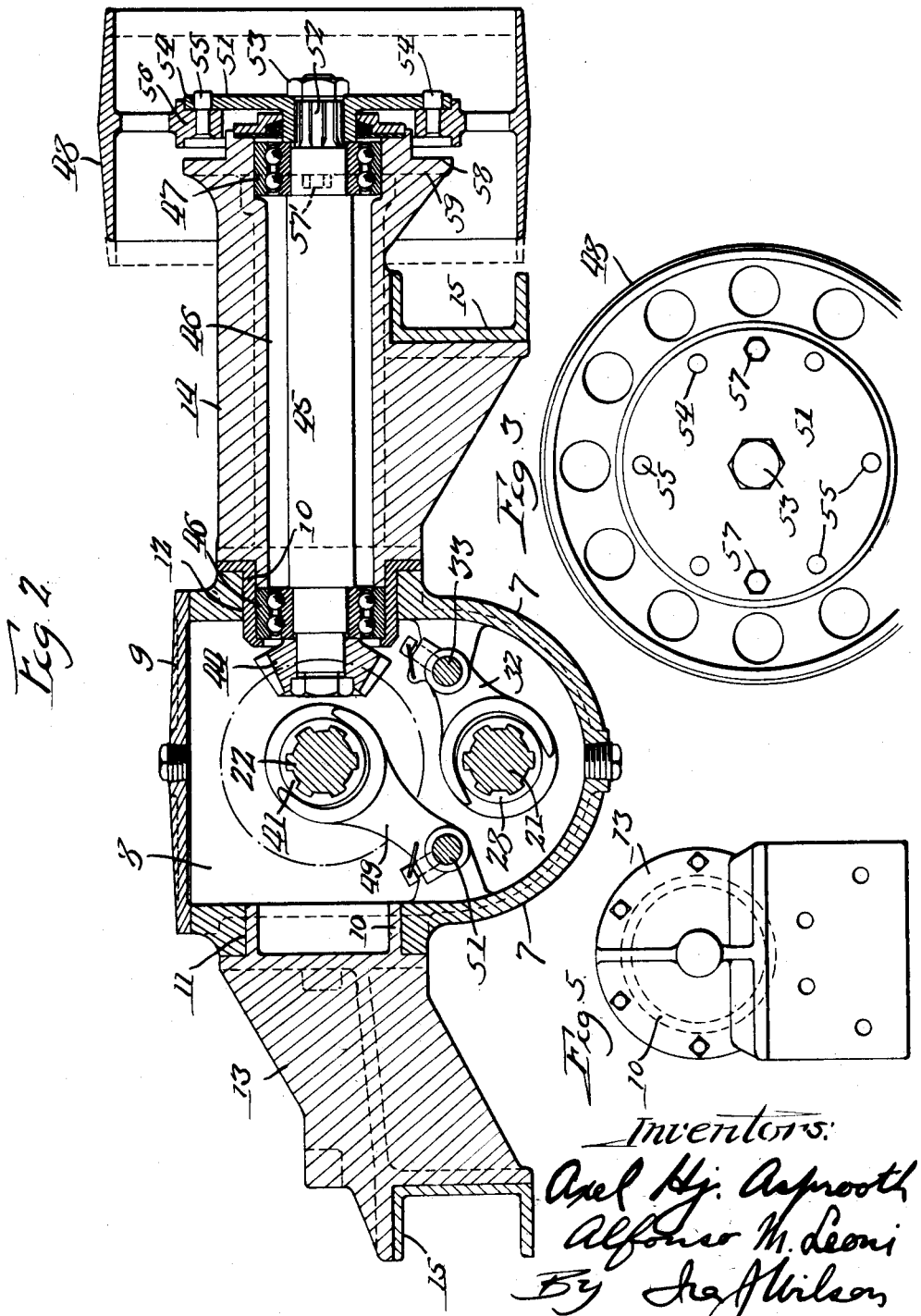

UNITED STATES PATENT OFFICE.

AXEL HJ. ASPROOTH, OF ROCKFORD, ILLINOIS, AND ALFONSO M. LEONI, OF DAYTON, OHIO, ASSIGNORS, BY MESNE ASSIGNMENTS, TO STEINMETZ ELECTRIC MOTOR CAR CORPORATION, OF BALTIMORE, MARYLAND, A CORPORATION OF MARYLAND.

CHANGE-SPEED GEARING.

1,385,105.   Specification of Letters Patent.   Patented July 19, 1921.

Application filed July 2, 1919. Serial No. 308,075.

*To all whom it may concern:*

Be it known that we, AXEL HJ. ASPROOTH and ALFONSO M. LEONI, citizens of the United States, residing at Rockford, in the county of Winnebago and State of Illinois, and at Dayton, in the county of Montgomery and State of Ohio, respectively, have invented certain new and useful Improvements in Change-Speed Gearing, of which the following is a specification.

This invention, pertaining in general to gearing, has more particular reference to change speed gearing adapted primarily for use in motor trucks and tractors.

One of the primary objects of our invention is to provide a generally improved and simplified change speed gear transmission for motor trucks and tractors, which shall comprise but few elements arranged compactly and in a novel manner for transmitting the desired drive and power pulley speeds. We have also aimed to provide a transmission constructed in such simple and novel manner that it will serve practically and efficiently the purposes desired and will be capable of production as a transmission unit at a comparatively low cost considering the functions and results obtained.

In furtherance of these general objects, and as a feature of our invention, we have aimed to so incorporate the driving element of a power pulley shaft with the gearing of the change speed mechanism that this power pulley driving element becomes a part of the main power train, and moreover, is so arranged that it effects a reverse drive. In this regard and in the particular arrangement of gearing as appears hereinafter, it will be noted that we obtain with but four gear elements, two speeds forward, two speeds reverse and forward and reverse power pulley speeds.

A further object of our invention is to simplify and improve a power pulley drive, whereby to obtain the desired drive in a practical and efficient manner; and our invention also contemplates as an object, constructing the casing and gearing in such novel manner as to provide what might be termed a power shaft unit interchangeably mounted so that it may be coöperatively associated with the main casing at either side thereof, thus permitting placement of this power pulley unit either at the left or right hand side of the casing as conditions may require.

Still another object resides in the provision of a transmission characterized by unbroken driving and driven shafts arranged in parallelism, a pair of idler gear elements on the driven shaft, a double gear element splined on the driving shaft and shiftable into engagement with either of said idler gear elements, a power pulley shaft having a bevel gear constantly in mesh with said idler gear elements, and clutches for connecting either idler gear element to the driven shaft.

Other objects and many of the attendant advantages will be appreciated by one skilled in the art as the invention becomes better understood by reference to the following description when considered in connection with the accompanying drawings, in which—

Figure 1 is a longitudinal sectional view through a change speed gear transmission embodying our improvements;

Fig. 2, a transverse sectional view taken substantially on line 2—2 of Fig. 1;

Fig. 3, a detail end view of the power pulley and its mounting;

Fig. 4, a detail sectional view illustrating the manner in which a driven shaft might be connected to a differential driving mechanism; and Fig. 5, a side view of the transmission casing at the left hand side of Fig. 2.

From an inspection of the drawings, it will be noted that we have provided a transmission casing or housing designated generally by character 7, shaped to provide a gear compartment 8, having a removable cover 9, and further shaped to provide laterally alined cylindrical openings 11 and 12 through opposite side walls. These openings are for the reception of casing-supporting brackets, one of which has embodied therewith a power-delivering shaft and is termed herein, a power shaft unit. These brackets designated generally by characters 13 and 14, having reduced annular ends 10 seated in the openings 11 and 12, and being shaped to seat upon the longitudinal channel beams or sills 15 of a vehicle or tractor frame, are rigidly secured as by bolts, to the main casing 7 and to the channel beams 15. As will appear hereinafter, the bracket 14 carries a power pulley shaft and is interchangeable with the bracket 13 for delivering the power drive from either the left or right hand side of the transmission.

The front and rear transverse walls 18 and 19 respectively of the casing 7 carry suitable bearings in which are journaled the driving and driven shafts 21 and 22. The several bearing openings through the walls 18 and 19 are suitably closed and packed at their outer ends to insure an oil tight casing. It will be noted that the outer annular race member of the bearing 23 is fixed or locked to the wall 18 while the outer race member of the bearing 24 is loose in the wall 19, thus allowing the necessary play in a shaft mounting of this kind. Similarly with respect to the driven shaft 22, the outer race member of the bearing 25 is fixed to the wall 19 and that of the bearing 26 is loose, as regards movement longitudinally of the shaft. In radial bearings of this character the inner race members, however, are fixedly secured to the shaft generally by being drawn tight by means of lock nuts 27 against shaft shoulders. The shaft 21 may be driven in any suitable manner from the engine, as through the agency of a clutch, and the driven shaft 22 may be suitably shaped at its power delivery end for connection either to a universal joint for connection through means of a shaft to the rear wheels, or for connection to any other driving expedient, as for example as illustrated in Fig. 4, in which a bevel gear 23 fixed to the shaft 22 is adapted for driving a differential mechanism.

As noted in Fig. 1, the driving gear is fluted or splined throughout its length between the bearings 23 and 24, and upon this portion is splined a driving gear element designated generally by character 28, having formed integral therewith, a spur gear 29 and a larger spur gear 31. This gear element may be shifted longitudinally on the driving shaft by means of a yoke 32, Fig. 2, fixed to a shifting rod 33, which may be operated by any suitable or preferred shifting means. The gears 29 and 31 are adapted to be meshed respectively with spur gears 34 and 35, which are loose on the driven shaft 22. These gears 34 and 35 are formed integral with idler gear elements designated generally by characters 36 and 37 respectively, which are also shaped to provide bevel gears 38 and 39 respectively. A clutch element 41 interposed between the gear elements 36 and 37 and splined on the shaft 22 is adapted to be shifted in either direction by any suitable means for clutching either the gear element 36 or 37 to the driven shaft, it being manifest from an inspection of Fig. 1, that the said gear elements are provided with suitable dental clutch teeth 42 and 43 for this purpose.

The gear elements 36 and 37 are in constant driving connection through the agency of an intermediate bevel gear 44 fixed to the inner end of a power pulley shaft 45, in turn suitably journaled at its inner end in a bearing 46 supported by the transmission casing. The power pulley shaft 45 extends through the bearing 46 in the casing section 14 and is journaled at its outer end in a bearing 47 and equipped at this end with a power pulley designated generally by character 48, the mounting of which will be described hereinafter. A shifting fork 49 coöperating with the clutch element 41 is connected to a rod 51, which as in the case of the shifting rod 33 mentioned above, is adapted to be operated by any suitable or preferred mechanism to shift the clutch and gear elements in the manner which will be presently described.

Assuming that the shaft 21 is revolved in a counterclockwise direction, viewing Fig. 2, and the several gear elements are in the position shown in full lines in Fig. 1, the element 28 only will be revolved. By shifting the gear element to the left and meshing the gear 29 with the gear 34, the gear elements 36, 44 and 37 will be revolved, the driven shaft 22 remaining idle, and the power shaft 45 being driven from the engine. By shifting the driving gear element 28 in the opposite direction to mesh the gear 31 with the gear 35, the power pulley shaft will be driven in the opposite direction but at a higher speed as will be obvious, due to the difference in speed ratio between the gears 29—34 and 31—35. It will thus be seen that the driving element 28 in effect constitutes a clutch for establishing a driving connection between the driving shaft and the power pulley shaft and for reversing the direction of drive of the latter.

In order to obtain low speed forward, the gear element 28 is shifted to connect the gears 29 and 34 and the clutch element 41 is shifted to the left to connect with the teeth 42. This establishes a direct drive between the driving shaft 21 and driven shaft 22 at the ratio of the gears 29—34, resulting in what might be termed low speed forward. By now shifting the clutch element 41 to the right and engaging the teeth 43, the shaft 22 will be driven in the reverse direction at the same low speed ratio. In this regard, it will be noted that the power pulley gear 44 enters into the combination and serves as a reversing gear between the gear elements 36 and 37 for revolving the latter gear in a reverse direction from that of the gear element 36. Bringing the shiftable elements to neutral again and then shifting the gear element 28 to the right to connect its gear 31 with the gear 35, and likewise shifting the clutch element 41 to the right to engage the teeth 43, will result in driving the shaft 22 forward at high speed. Leaving the gears 31 and 35 engaged and shifting the clutch 41 to the left to engage the teeth 42 will give reverse at high speed. From the foregoing, it will be manifest that through the agency of but four general gear elements 28, 36, 37 and 44 and a clutch 41, we obtain forward and reverse power pulley drive at different speeds, and two speeds forward and two reverse for the main power drive.

Under certain conditions it is desired to deliver the belt power from the side of the transmission opposite from that at which the pulley is shown, and to this end it is only necessary to reverse the brackets 13 and 14. That is, they are interchanged so that the power pulley shaft unit occupies the position of the bracket 13 in Fig. 1. Inasmuch as the openings 11 and 12 are of equal size, in alinement, and equal distances from the shaft 22, the gear 44 will mesh with the gears 38 and 39 equally as well in either position. By so changing the position of the power pulley shaft unit the direction of drive of the power pulley will be reversed, as will be obvious.

The mounting of the power pulley 48 forms the subject-matter of another application. It will be noted that there is provision made for detachment of the pulley from the power pulley shaft and remounting of the pulley in a stationary idle position in which the pulley flange constitutes a stationary guard or casing about the live end of the power shaft. This is effected in a very simple manner, in the present case, simply by removing two cap screws and inserting them again in different holes for remounting the pulley. Thus, when the power pulley is not in use, it will be disconnected from its driving shaft and held in an idle position, although serving at the same time to protect the live end of the drive shaft. One advantage following from the use of this feature is that it obviates the necessity of a shiftable clutch between the power pulley and its driving shaft, or between this shaft and a driving member. It will be manifest that a material saving in the cost of production is obtained, and at the same time a very practical and efficient drive. As shown in Fig. 2, an annular plate 51, the hub of which is splined on the end 52 of the power shaft 45 and further secured thereon by a nut 53, is provided at circumferentially spaced points with holes 54 for the reception of locating and driving pins 55 fixed to the hub 56 of the pulley 48. Cap screws 57, Fig. 3, passing through the plate 51 and threadingly engaging the hub 56, rigidly secure the power pulley to the plate 51. It will be observed that the hub 56 is disposed at the inside of the plate 51 and that the casing bracket 14 is shaped to provide an annular seat 58 spaced inwardly from the hub 56 when the latter is in operative position. By removing the cap screws 57, the power pulley may be shifted inwardly, to a position on the seat 58, and by passing the cap screws 57' through the wall 59 from the inner side thereof and engaging these screws in the hub 56, the power pulley may be rigidly secured to the frame 14 in a position entirely withdrawn from the plate 51. In this position, the flange of the power pulley circumscribes the plate 51 and effectually serves as a protective casing about this plate or live end of the shaft 45. Thus, when the power pulley is not needed, it will be shifted to and secured in the idle position just described, and when it is to be used it will be remounted on the plate 51, as will be obvious.

It is believed that the foregoing conveys a clear understanding of the mode of operation and of the principles of our invention and of the objects prefaced above, and while we have illustrated and described but a single working embodiment thereof, it should be understood that various changes might be made in the construction and arrangement without departing from the spirit and scope of the invention as expressed in the appended claims, in which—

We claim:

1. In a change speed gearing, the combination of a pair of shiftable integrally connected driving gears of different diameters, driven gears of different diameters adapted to be respectively engaged by said driving gears, a shaft in constant driving connection with both of said driven gears, and a power pulley mounted on said shaft.

2. In a change speed gearing, the combination of a pair of shiftable driving gears of different diameters, a pair of driven gear elements of different diameters, each including a bevel gear and a spur gear, the latter of which is adapted to be engaged by one of said driving gears, a bevel gear interposed between and in mesh with both bevel gears of said gear elements, and a power pulley in driving connection with said bevel gear.

3. In a change speed gearing, the combination of a driving and a driven shaft, a pair of double-gear elements loosely revoluble on a driven shaft and each having a spur gear and a bevel gear, the spur gears being of different diameter and the bevel gears of equal diameter, a power pulley shaft and a bevel gear thereon interposed between and in mesh with both said bevel gears, and a double-gear element splined on the driving shaft and comprising a pair of spur gears of different diameters, each adapted to mesh respectively with one of the first mentioned spur gears.

4. In a change speed gearing, the combination of a driving and a driven shaft, a pair of double-gear elements loosely revoluble on the driven shaft and each having a spur gear and a bevel gear, the spur gears being of different diameter and the bevel gears of equal diameter, a power pulley shaft and a bevel gear thereon interposed between and in mesh with both said bevel gears, a double-gear element splined on the driving shaft and comprising a pair of spur gears of different diameters, each adapted to mesh respectively with one of the first mentioned spur gears, and means for clutching either of the double-gear elements on the driven shaft thereto at will.

5. In a power transmission mechanism, the combination of a driven shaft, a pair of gear elements mounted to revolve freely thereon but held against longitudinal movement with respect thereto, each gear element including a spur gear and a bevel gear, the spur gears being of different diameters and arranged on the outside, a bevel gear interposed between and in mesh with both bevel gears of said gear elements, a power pulley shaft adapted to be driven by the single bevel gear, a clutch element splined on the driven shaft between said gear elements and adapted to clutch either of said elements to the shaft, and means for driving either of the gear elements.

6. In a power transmission gearing, a driven shaft, independent gear elements thereon, a power shaft, a driving connection between said power shaft and both of said gear elements, a driving shaft, and means on said driving shaft to selectively engage either of said gear elements to thereby vary the speed of the power shaft.

7. In a power transmission mechanism, a driven shaft, independent gear elements thereon, a power shaft, a gear meshing with both of said gear elements and operating the power shaft, a driving shaft, a gear element thereon having variable gear faces, and means whereby said gear elements on the driven shaft may be selectively operated by the gear element on the driving shaft.

8. In a power transmission mechanism, a power shaft, a driven shaft, independent gear elements on the driven shaft in constant driving connection with the power shaft, a driving shaft, a gear element shiftable on said shaft and having independent and variable gear faces to selectively operate either of the gear elements on the driven shaft, and means whereby either of said gear elements on the driven shaft may be operatively connected thereto at will.

9. In a transmission mechanism, the combination of a main gear casing, gearing therein, a power shaft unit including a gear adapted to be driven by a gear within said casing, and means permitting said unit to be operatively associated with the main casing in any of a plurality of different positions with respect to said casing and with the power shaft gear in driving relation with said gear in the casing.

10. In a transmission mechanism, the combination of a main gear casing having laterally alined cylindrical openings, gearing within the casing including a bevel gear, the axis of which is at right angles to and coplanar with that of said openings, casing-supporting structures interchangeably insertible in said openings, and a power shaft and bevel driving gear therefor carried by one of said structures, the latter bevel gear being adapted to mesh with said bevel gear in the main casing when in either position.

11. In a transmission mechanism, the combination of a gear casing having laterally alined openings through its side walls, gearing within the casing, a casing-supporting means coöperatively associated with each opening, and a power pulley shaft carried by one of the casing-supporting means and constituting therewith a power pulley unit which is interchangeable with the casing-supporting means at the opposite side of the gear casing, the power pulley shaft being operatively associated with said gearing in either position of said unit.

12. In a transmission mechanism, the combination of a main casing, gearing therein including a bevel gear, a power delivery shaft, a bevel gear for driving such shaft, a casing supporting the power delivery shaft and its gear in juxtaposition and constituting a unit, and the main casing being constructed to receive said unit at any of a plurality of different sides of the main casing and with the power delivery gear in driving relation with the bevel gear in the main casing.

AXEL HJ. ASPROOTH.
ALFONSO M. LEONI.